US006975634B1

(12) United States Patent
Chow et al.

(10) Patent No.: US 6,975,634 B1
(45) Date of Patent: Dec. 13, 2005

(54) METHOD FOR INTEGRATING WIRED AND WIRELESS PACKET/CELL NETWORKING VIA ATM

(75) Inventors: Albert T. Chow, Hillsdale, NJ (US); Jinman Kim, Chatham, NJ (US); Robert Raymond Miller, II, Convent Station, NJ (US); Wenchu Ying, Cedar Knolls, NJ (US)

(73) Assignee: AT&T Corp., Bedminster, NJ (US)

( * ) Notice: Subject to any disclaimer, the term of this patent is extended or adjusted under 35 U.S.C. 154(b) by 903 days.

(21) Appl. No.: 09/875,774

(22) Filed: Jun. 6, 2001

Related U.S. Application Data

(60) Provisional application No. 60/219,776, filed on Jul. 20, 2000.

(51) Int. Cl.[7] .......................... H04L 12/28; H04L 12/56
(52) U.S. Cl. ...................... 370/401; 370/402; 370/404
(58) Field of Search ............................... 370/401, 402, 370/404, 400, 386, 351, 338, 312, 310.1, 370/277, 285, 310.2, 352–360, 328, 395.6, 370/395.5, 395.51, 411, 466, 467, 469, 473, 370/493, 902, 901, 911, 912, 913, 403; 455/403, 455/56.1, 89, 575, 524, 433, 425, 550.1

(56) References Cited

U.S. PATENT DOCUMENTS 6,314,284 B1 * 11/2001 Patel et al. ................. 455/417
6,359,880 B1 * 3/2002 Curry et al. ................. 370/352
6,452,923 B1 * 9/2002 Gerszberg et al. .......... 370/352
6,542,497 B1 * 4/2003 Curry et al. ................. 370/352
6,560,327 B1 * 5/2003 McConnell .................. 379/229
6,600,734 B1 * 7/2003 Gernert et al. .............. 370/352
6,728,215 B1 * 4/2004 Alperovich et al. ......... 370/252
6,754,218 B1 * 6/2004 Murakami ................ 370/395.7
6,757,285 B1 * 6/2004 Lakhani et al. ........... 370/395.2
6,831,902 B1 * 12/2004 Dougherty et al. ......... 370/328
2003/0119500 A1 * 6/2003 Mukherjee et al. ......... 455/433
2003/0165124 A1 * 9/2003 Alperovich et al. ........ 370/331

* cited by examiner

Primary Examiner—Wellington Chin
Assistant Examiner—Jamal A. Fox

(57) ABSTRACT

Integration of packet/cell networking of a wired/wireless network with ATM is achieved by application of a distributed architecture including an ATM network adapted to provide such integration. Network and protocol conversion between the wired/wireless network and the ATM network is performed by a gateway (GAGW) having capabilities to perform this function. A mobility server platform (MSP) handles routing between the gateways to other networks and the micro-mobility functions of the wireless base stations directly connected to the ATM network. A Inter-working function (IWF) element connects base stations (BS) or mobile switching centers (MSC) to ATM switch/routers and in the process provides various protocol conversions necessary to integrate various services into the ATM backbone. The integration of these networks is seamless with little apparent affect on the end point users of the ATM network on the overall system.

18 Claims, 3 Drawing Sheets

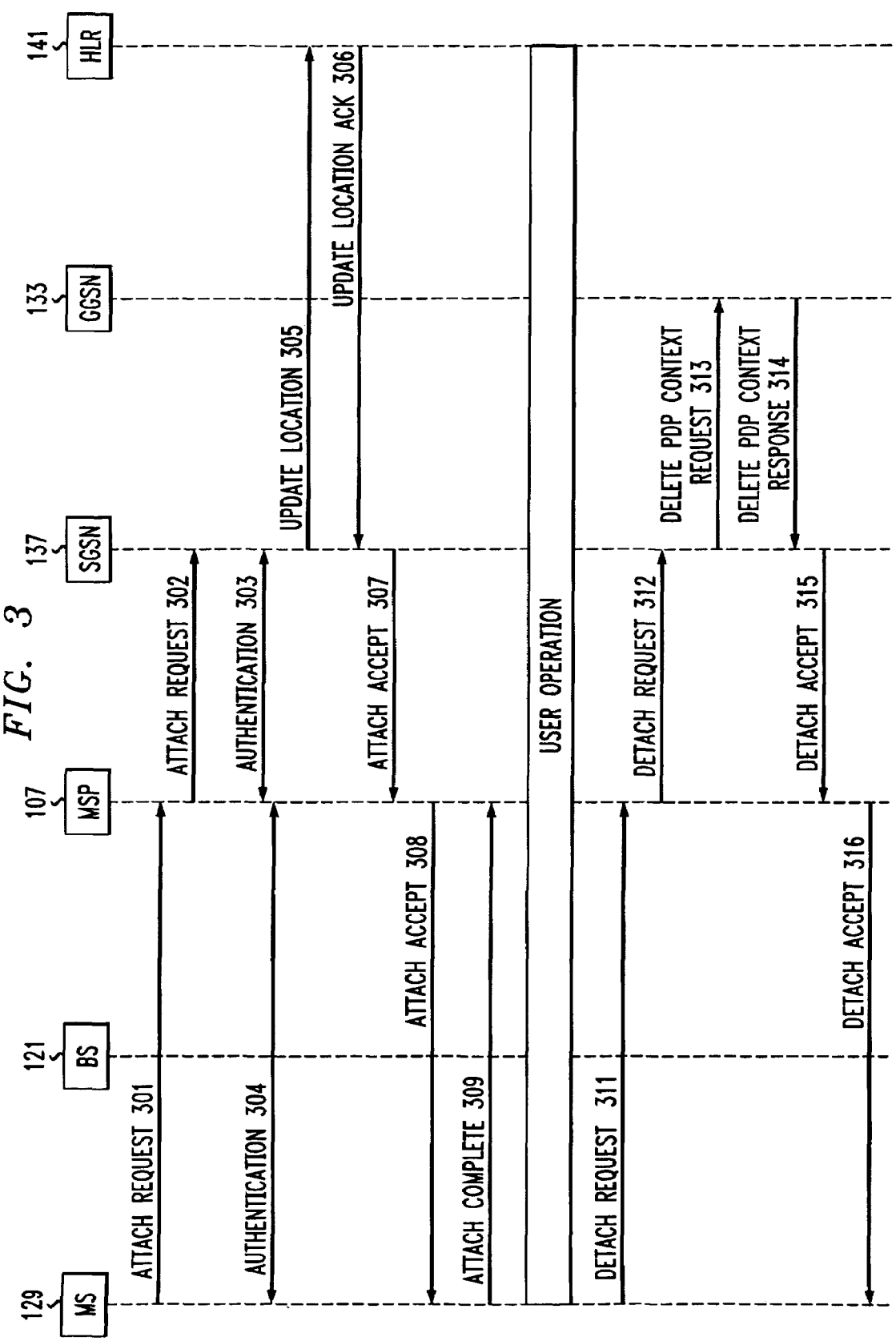

METHOD FOR INTEGRATING WIRED AND WIRELESS PACKET/CELL NETWORKING VIA ATM

This application claims the benefit of priority of Provisional Application No. 60/219,776, filed on Jul. 20, 2000.

FIELD OF THE INVENTION

This invention relates to wired and wireless packet/cell networking via ATM and in particular, a method for integrating wired and wireless packet/cell networks with an ATM network without an adverse impact on the existing ATM network.

BACKGROUND OF THE INVENTION

Wireless systems are evolving from the existing digital systems to new standards and equipment in order to provide new services. These services involve fast packet data services and such additional services as offering an "always connected" mode to an IP network for mobile subscribers. In particular a new third generation of mobile phones are being designed with fast internet connections. Some pre third generation systems also provide the internet connections.

Mobile phone services are becoming nation wide and extend over a wide area. These services may range across video, instant messaging, music service, stock market prices and trades, e-commerce, traffic guidance as well as many other IP type services. Extending these features to a wide area often requires the integration of service across many different networks. ATM networks have desirable characteristics that may be used to provide this integration.

ATM (Asynchronous Transfer Mode) is becoming a well-established transport medium within the telecommunications network. In ATM, individual packets (i.e., cells) are presented to the network asynchronously. Its rising popularity is due to its high speed; a critical ability for data transport and various media applications. It is characterized by high bandwidth, low delay, and packet (i.e., cell) switching capability. Ability to maintain a defined QoS (Quality of Service) is one major advantage of ATM. However, the fixed length of packets (i.e. cells) in ATM networks conflicts with packets generally used in other networks that have variable packet lengths.

Providing high-speed data service allowing transfer of information (i.e., sending and receiving), as noted above, is becoming an important feature of newly emerging wireless communication systems (i.e., cellular/PCS networks). System speed as well as QoS is important. Because voice, data and multimedia are readily accommodated by ATM, it appears to be a valuable transport medium for providing network transport between wireless systems providing such services. It becomes desirable to integrate the ATM network with the wireless network or networks providing these services. However, for many reasons, including its fixed packet lengths and the lack of the mobility functionality, the existing ATM network is not quite suited to be integrated with wireless networks that use Frame Relay packets of a variable and much longer length.

One new proposed wireless system with packet data capability is the General Packet Radio Service (GPRS) allowing fast packet data connections as indicated above and in which the mobile unit is in an "always connected" mode. This system is anticipated to be operational in advance of the new proposed 3G network. GPRS is a network that enables connections of subscriber equipment to a data network (i.e., Internet). It permits ready access of subscribers to external IP-based networks. It however uses frame relay packets that are not directly compatible with ATM networks.

In order to achieve these benefits and services it is necessary to provide network architecture to achieve integration of GPRS and like networks with other networks (i.e., such as ATM networks) using different structured packets for information transmission. In order to fully enjoy the benefits of the new available services provided by such integration, the network architecture should support such functions as call processing including signaling communication, feature applications, and provide for handoff functions and personal mobility management whereby mobile subscribers may connect to other wired subscribers and mobile subscribers through the integrating network.

SUMMARY OF THE INVENTION

Integration of packet/cell networking of a wired/wireless network with ATM is achieved, in accord with the principles of the invention, by application of a distributed architecture including an ATM network adapted to provide such integration. Network and protocol conversion between the wired/wireless network and the ATM network is performed by a gateway (GAGW) having capabilities to perform this function. A mobility server platform (MSP) controls routing between the gateways to other networks through the ATM network and the wireless base stations directly connected to the ATM network. A Inter-working function (IWF) element connects base stations (BS) or mobile switching centers (MSC) to ATM switch/routers and in the process provides various protocol conversions necessary to integrate various services into the ATM backbone. The integration of these networks is seamless with little apparent affect on the end point users of the ATM network on the overall system.

In one exemplary embodiment, a GPRS (General Packet Radio Service) network is integrated with an ATM backbone network in order to utilize the mobility functions of the GPRS network with the ATM network without having to add the mobility into the existing ATM networks. The two networks are connected by a GPRS-to-ATM gateway (GAGW) that converts frame relay packets of the GPRS network into cells of the ATM network. Data and information transmitted to the ATM network is switched/routed in response to control by a mobility server platform (MSP) that allows information and signaling to flow to and from any node destination of the ATM network. Switch/routing nodes of the ATM network are connected to wireless base stations through an inter-working function (IWF) interface to provide proper protocol conversions between ATM node and wireless base station.

BRIEF DESCRIPTION OF THE DRAWINGS

FIG. 3 is an attach/detach flow diagram of the wireless GPRS/ATM network with the MSP used to control signal routing in the ATM network of FIG. 1;

DETAILED DESCRIPTION

A service architecture, embodying principles of the invention, uses an ATM backbone network for interconnecting wireless stations coupled to a GPRS network with wireless stations connected to the ATM network. It achieves this by integrating the ATM network with the GPRS network and if needed integrating several different networks through the ATM network. ATM is selected for the core backbone network structure because its fixed length cell (of 53 octets) enables better control of transport QoS. With systems that are intended to transmit data, voice, video and multimedia (in real time) QoS is very important to provide a uniformity of quality in providing these services. GPRS is noted for its always-connected mode of operation and the ATM backbone network continues to provide this feature.

Figure 1:
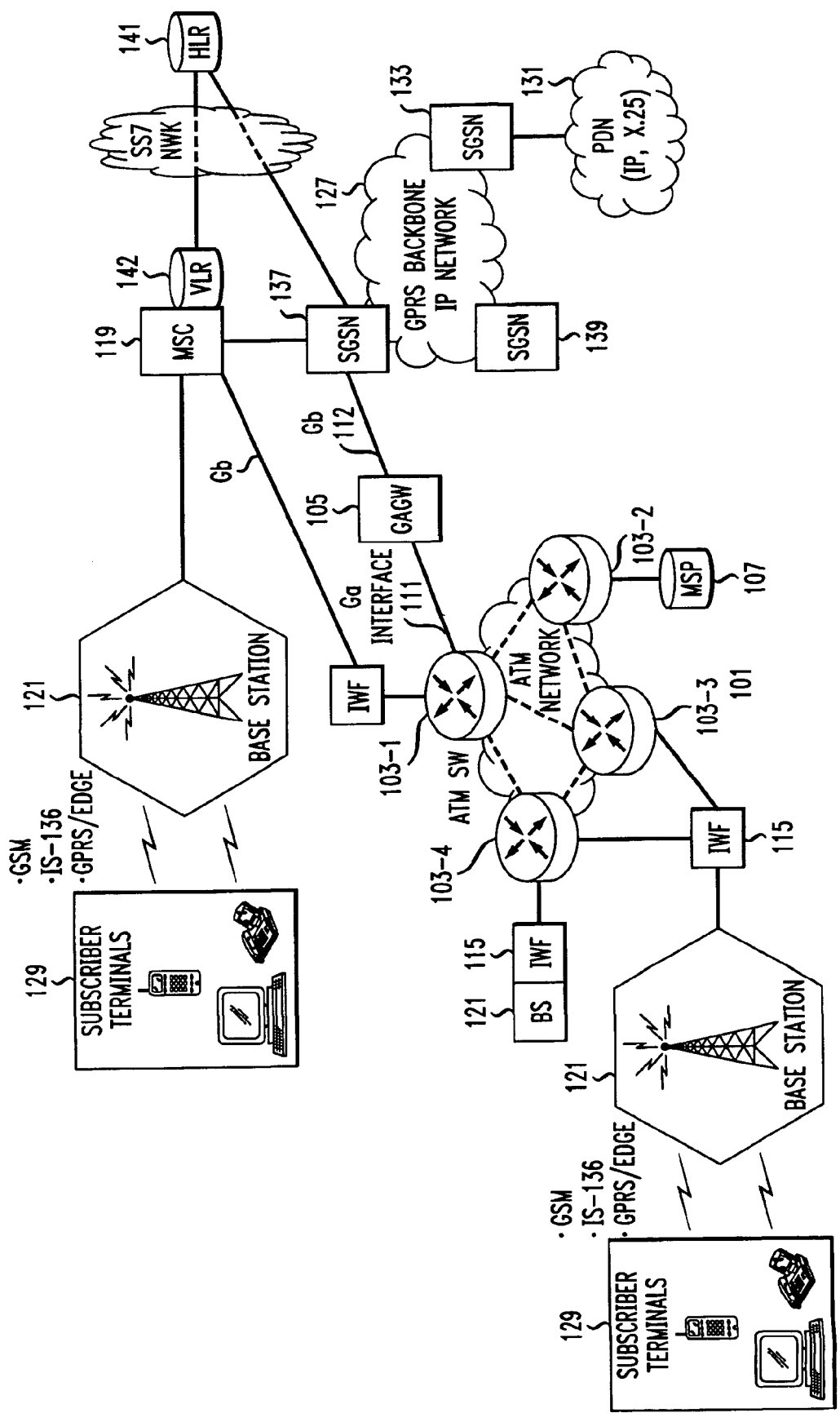
FIG. 1 is a typical service architecture of a network for providing services through an intermediary ATM network.

An illustrative architecture, as shown in the FIG. 1, shows a core ATM backbone network 101 that includes the interconnected switch/routing nodes 103-1 through 103-4. Node 103-1 is connected to a GPRS-ATM gateway (GAGW) 105, via a Ga-interface (Ga) 111, and node 103-2 is connected to a mobility server platform (MSP) 107. Nodes 103-3 and 103-4 are shown as connected to wireless base stations 121 via inter-working function devices (IWF) 115. Node 103-1 connects to a mobile switching center (MSC) 119 connecting wireless base stations to the GPRS network. GAGW 105 provides network intelligence and protocol conversion between the GPRS network and the ATM network. From a GPRS perspective it is a base station and to the ATM it appears as an ATM switch. Its functions are described more fully below. A Mobility Server Platform (MSP) 107 provides the call and services routing among the GAGW 105 and the various BSs 121 connected to the GPRS backbone network 127, via MSCs 119. Base stations 121 all service various mobile stations 129.

GPRS 127 is a network designed to provide GPRS wireless communication service that is packet based and provides high data rates and continuous connection to IP networks such as network 131 connected to GPRS 127 via a Gateway GPRS support node (GGSN) 133 providing gateway functions such as packet delivery to/from public Internet, security and accounting. Another network element a Serving GPRS Support Node (SGSN) 137 performs mobility management and manages the logical link to mobile terminals. GGSN and SGSN elements are well known in the GPRS art and hence need not be disclosed in detail.

A PDN (Private Data Network) 131 is connected to the GPRS backbone network 127 via GGSN 133. An SS7 signaling network is connected to the GPRS network via SGSN 137. Various other networks may be coupled into the GPRS network with other SGSN 137. Included in the varied networks may be HLRs (Home Location Registers) 141 and VLRs (Visitor location registers) 142 and Mobile Switching Centers (MS C) 119.

GAGW 105 is a gateway to provide network intelligence and protocol conversion between the GPRS and the ATM network. It is essentially an ATM switch modified with software to support network intelligence and protocol conversion. The GAGW 105 is built to support frame relay (FR) operations by converting FR information fields of the GPRS network into information (i.e., ATM cell format) that the ATM switch at the edge of the ATM network can handle and forward to other ATM switches for providing mobile service. Specific functions performed are 1. Supporting FR operation;
2. Providing bi-directional ATM and FR protocol conversion;
3. Providing call processing for all services; and
4. Providing operations, administration and maintenance services.

Figure 2:
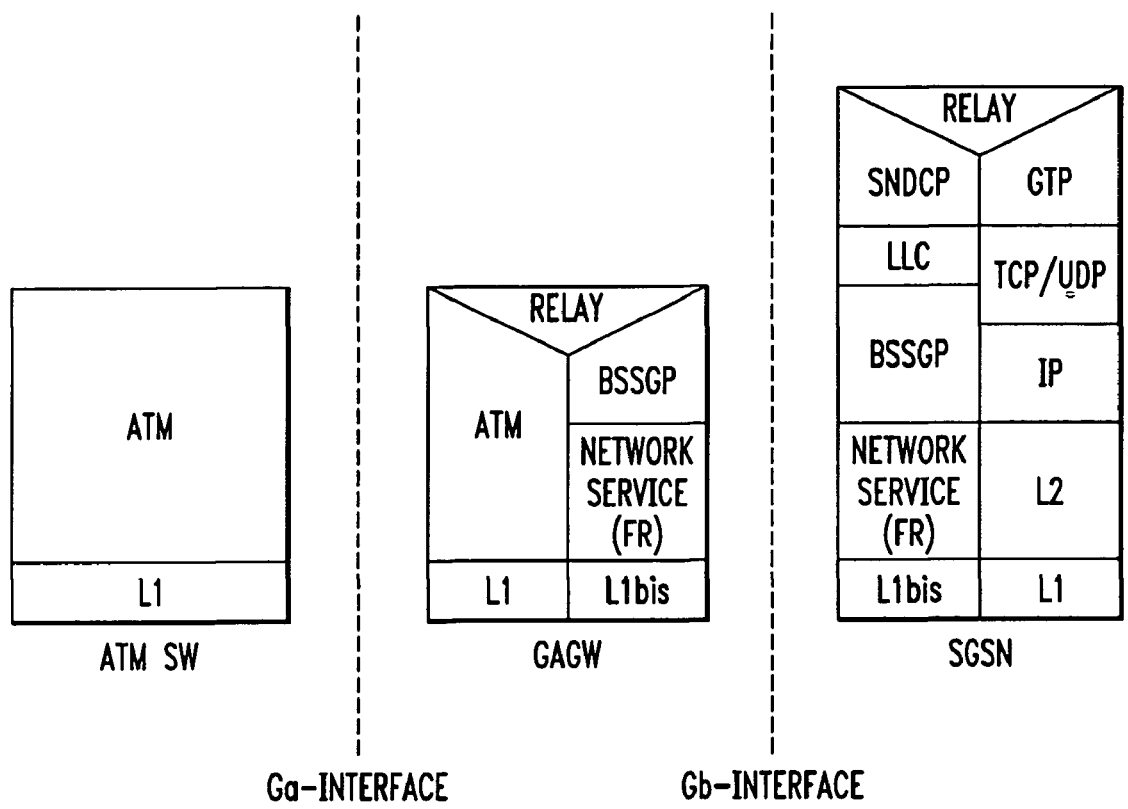
FIG. 2 is a schematic of a protocol conversion at GAGW gateway used in the network of FIG. 1.

The protocol conversion at the GAGW 105 is shown in FIG. 2. Protocol conversions illustrated in FIG. 2 depict protocol conversions effected in the system shown in FIG. 1 at the Ga 111 and Gb 112 interfaces. GAGW, located intermediate the Ga and Gb interfaces, converts the Network Service protocol (Frame Relay in GPRS network 127) into an ATM protocol (i.e., ATM cells) required by the ATM network 101. BSSGP (Base Station System GPRS Protocol) in the FIG. 2 is the GPRS layer conveying routing and QoS-related information between BSS (i.e., base station systems) and SGSN 137. GAGW also translates the information carried in BSSGP into ATM switching functions. The flow of protocol conversions is believed apparent, to those skilled in the art, from the diagram and a detailed description is not believed necessary.

Mobility Server Platform (MSP) 107 controls the call and services routing, via the ATM network 101, among the various base stations coupled to the ATM network 101 and the GAGW 105. It interacts with the mobility entities contained in the GRPS such as MSC 119 and HLR 141 etc. While shown as a separate element in the FIG. 1, it may be collocated with the GAGW if desired. The operation of the MSP 107 may be readily ascertained from the attach/detach flow diagram shown in FIG. 3.

A MS (i.e., mobile station) 129 initiates the attach (registration) procedure by transmission of an Attach Request message directed to the SGSN 137. The message is sent, via flow line 301, to the MSP 107 in the ATM network 101, which extracts necessary information from the MS and forwards, via flow line 302, it to SGSN 137. After authentication procedures, the SGSN 137 sends an Update Location, via flow line 305, to the HLR 141. The HLR 141 acknowledges the Update Location message by sending an Update Location ACK, via flow line 306, to the SGSN 137 after the changing the mobility management information. If the Update Location is rejected by the HLR 141, the SGSN 137 rejects the Attach Request from the MS 129 with an appropriate cause determined. The SGSN 137 sends an Attach Accept message, via flow line 307, to the MSP 107, which handles the mobility of the MS 129 inside the ATM network 101. The MSP 107 forwards the Attach Accept message to the MS 129, via flow line 308, which acknowledges it by sending a return Attach Complete message via flow line 309, to the MSP 107. After the attach procedure is processed through the MSP, the micro-mobility functions inside the ATM network 101 are handled by the MSP 107 without further sending/receiving or the mobility-related messages to/from the SGSN 137.

After finishing the operation, the MS 129 informs the ATM network 101 that it wants to have the GPRS 127 detach (i.e., de-registration) by sending a Detach Request, via flow line 311, to the MSP 107. The MSP 107 forwards, via flow line 312, it to the SGSN 137, which deactivates the active mobile context by sending a Delete PDP (Packet Data protocol) Context Request message (i.e., contest required to communicate external packet data networks) to the GGSN 133, via flow line 313. GGSN 133 acknowledges this message with a Delete PDP Context Response reply to the SGSN 137, via flow line 314. The SGSN 137 sends a Detach Accept message, via flow line 315, to the MSP 107, and the MSP removes registration and mobility information from its database, and forwards the Detach Accept message is forwarded, via flow line 316, to the MS 129.

While the foregoing exemplary embodiment contemplates the integration of GPRS and ATM networks it is to be understood that this is only an exemplary embodiment of the invention. Various other networks (I.e., such as UMTS, IS-136, EDGE, etc.) may be integrated with the ATM network according to the principles of the invention. These may be embodied according the teaching of the invention. The scope of the invention is to be primarily defined by the claim language that reflects the spirit of the disclosure.

GLOSSARY OF INITIALISMS USED IN THE SPECIFICATION

MS: A mobile terminal/station, often a wireless communication device.
BS: A wireless base station for communicating with wireless communication devices (i.e., a MS)
IWF: InterWorking function; an interconnect of ATM and BSs or Mobile switching centers. Provides protocol conversions necessary to integrate services into the ATM backbone.
ATM network: A packet network using cells (i.e., a 53 octet packet) for transmission of communication.
VSN: Virtual signaling network for establishing signaling paths within the ATM network.
GAGW: GPRS_ATM gateway provides network intelligence and protocol conversion between a GPRS and ATM network
Ga: An interface connecting a GAGW and ATM network.
Gb: An interface connecting a GAGW to a SGSN via a frame relay (FR) network.
MSP: Mobility Server Platform, controls call and routing services among GAGW and BS via the ATM network.
SGSN: Server GPRS Supporting Node provides mobility management and manages logical link to mobile terminals.
GGSN: Gateway GPRS Support Node provides border gateway functions such as security and accounting.
UMTS: Universal Mobile Telecommunications Systems. A third generation (3G) broadband packet based wireless transmission service.

What is claimed is:

1. A method of integrating wired and wireless packet/cell transmission networks with an ATM network, comprising the steps of:
    connecting an intermediate ATM network with access stations of a wired/wireless large area networks, including steps of:
    establishing signaling and information communication between a server node in the large area network and a gateway connected to the ATM network;
    transmitting the signaling and information communication from the large area network to a gateway connected to one switch of the ATM at the gateway converting all information into a cell format for communication to a switch of the ATM network;
    providing the ATM network processes to allow services and signaling to traverse the ATM network from the entry gateway to a terminating point node of the ATM network;
    at the terminating point converting all information to a format suitable for the receiving station or network; and
    providing a mobility server platform connected to the ATM network which accepts requests from a mobile station and directs such requests to various control elements of a communication network connected to varied wireless base stations;
    and updating a MS location by an inquiry addressed to a home location register (HLR).

2. A method of integrating wired and wireless packet/cell transmission networks with an ATM network, comprising the steps of:
    connecting an intermediate ATM network with access stations of a wired/wireless large area networks, including steps of:
    establishing signaling and information communication between a server node in the large area network and a gateway connected to the ATM network;
    transmitting the signaling and information communication from the large area network to a gateway connected to one switch of the ATM at the gateway converting all information into a cell format for communication to a switch of the ATM network;
    providing the ATM network processes to allow services and signaling to traverse the ATM network from the entry gateway to a terminating point node of the ATM network;
    at the terminating point converting all information to a format suitable for the receiving station or network; and
    providing a protocol conversion process for converting network packets into ATM cells;
    and providing information fragmentation/defragmentation in transfer of information through the gateway.

3. A method of integrating wired and wireless packet/cell transmission networks with an ATM network, comprising the steps of:
    connecting an intermediate ATM network with access stations of a wired/wireless large area networks, including steps of:
    establishing signaling and information communication between a server node in the large area network and a gateway connected to the ATM network;
    transmitting the signaling and information communication from the large area network to a gateway connected to one switch of the ATM at the gateway converting all information into a cell format for communication to a switch of the ATM network;
    providing the ATM network processes to allow services and signaling to traverse the ATM network from the entry gateway to a terminating point node of the ATM network;
    at the terminating point converting all information to a format suitable for the receiving station or network; and
    sending an attach request message from a mobile station (MS) to a SGSN to initiate mobile station service.

4. The method of claim 3 including further steps of:
    returning an acceptance message from the SGSN to the MS to confirm mobile service.

5. The method of claim 4 including further steps of:
    initiating a disconnect with a request from the MS directed to the SGSN.

6. The method of claim 5 including further steps of:
    completing a disconnect with an acceptance from the SGSN to the MS.

7. The method of claim 3 including further steps of:
    updating a MS location by an inquiry addressed to a home location register (HLR).

8. The method of claim 5 including further steps of:
    initiating a disconnect includes a PDP context request addressed to a GSNN.

9. A communication network in which wireless and wired networks are integrated into an interacting unified entire network for providing end-to-end transport of voice, data and multimedia in packet and cell format, comprising:
    the unified entire network including;

a first communication network including at least one of wireless, wired, and IP service;

an ATM network having one of its switch/routing nodes connected to the first communication network by a gateway functioning to convert information of the first network to an ATM cell format;

a mobility server platform (MSP) connected to a ATM switch/routing node and functioning to provide call and routing services from the gateway to terminating ATM switching/routing nodes;

terminal interfaces connecting ATM switch/routing nodes to wireless base stations and including protocol conversion to convert ATM cells to wireless protocol; and the gateway connecting the ATM network to the first communication network including, a protocol conversion for converting frame relay packet format to ATM cell format; and the gateway providing information fragmentation/defragmentation in transfer of information through the gateway.

10. A communication network in which wireless and wired networks are integrated into an interacting unified entire network for providing end-to-end transport of voice, data and multimedia in packet and cell format, comprising:
the unified entire network including;
a first communication network including at least one of wireless, wired, and IP service;
an ATM network having one of its switch/routing nodes connected to the first communication network by a gateway functioning to convert information of the first network to an ATM cell format;
a mobility server platform (MSP) connected to a ATM switch/routing node and functioning to provide call and routing services from the gateway to terminating ATM switching/routing nodes;
terminal interfaces connecting ATM switch/routing nodes to wireless base stations and including protocol conversion to convert ATM cells to wireless protocol; and
the gateway connecting the ATM network to the first communication network including, a protocol conversion for converting frame relay packet format to ATM cell format; and
an interworking function (IWF) connected for converting signaling and service protocols into a form suitable for integrating these services into the ATM network.

11. A communication network in which wireless and wired networks are integrated into an interacting unified entire network for providing end-to-end transport of voice, data and multimedia in packet and cell format, comprising:
the unified entire network including;
a first communication network including at least one of wireless, wired, and IP service;
an ATM network having one of its switch/routing nodes connected to the first communication network by a gateway functioning to convert information of the first network to an ATM cell format;
a mobility server platform (MSP) connected to a ATM switch/routing node and functioning to provide call and routing services from the gateway to terminating ATM switching/routing nodes;
terminal interfaces connecting ATM switch/routing nodes to wireless base stations and including protocol conversion to convert ATM cells to wireless protocol; and
the mobility service platform (MSP) being further connected for interacting with a network connected to a home location register.

12. The communication network as claimed in claim 11, comprising:
the mobility service platform (MSP) being co-located with the GAGW.

13. A communication network in which wireless and wired networks are integrated into an interacting unified entire network for providing end-to-end transport of voice, data and multimedia in packet and cell format, comprising:
the unified entire network including;
a first communication network including at least one of wireless, wired, and IP service;
an ATM network having one of its switch/routing nodes connected to the first communication network by a gateway functioning to convert information of the first network to an ATM cell format;
a mobility server platform (MSP) connected to a ATM switch/routing node and functioning to provide call and routing services from the gateway to terminating ATM switching/routing nodes;
terminal interfaces connecting ATM switch/routing nodes to wireless base stations and including protocol conversion to convert ATM cells to wireless protocol; and
a GPRS backbone IP network connected to the GAGW by a SGSN.

14. A communication network in which wireless and wired networks are integrated into an interacting unified entire network for providing end-to-end transport of voice, data and multimedia in Packet and cell format, comprising:
the unified entire network including;
a first communication network including at least one of wireless, wired, and IP service;
an ATM network having one of its switch/routing nodes connected to the first communication network by a gateway functioning to convert information of the first network to an ATM cell format;
a mobility server platform (MSP) connected to a ATM switch/routing node and functioning to provide call and routing services from the gateway to terminating ATM switching/routing nodes;
terminal interfaces connecting ATM switch/routing nodes to wireless base stations and including protocol conversion to convert ATM cells to wireless protocol; and
a MSC connected to the ATM network by an IWF.

15. A communication network in which wireless and wired networks are integrated into an interacting unified entire network for providing end-to-end transport of voice, data and multimedia in packet and cell format, comprising:
the unified entire network including;
a first communication network including at least one of wireless, wired, and IP service;
an ATM network having one of its switch/routing nodes connected to the first communication network by a gateway functioning to convert information of the first network to an ATM cell format;
a mobility server platform (MSP) connected to a ATM switch/routing node and functioning to provide call and routing services from the gateway to terminating ATM switching/routing nodes;
terminal interfaces connecting ATM switch/routing nodes to wireless base stations and including protocol conversion to convert ATM cells to wireless protocol; and
a base station being connected to the ATM network by an IWF.

16. The communication network as claimed in claim 13, comprising:
a public data network connected to the GPRS backbone IP network by a GGSN.

17. In a communication network for providing voice, data and multimedia service, a method of integrating various wireless systems through an inner core ATM network, comprising the steps of:
   coupling a plurality of base stations of multiple wireless systems via wired network interconnections, the coupling of wired network interconnections including:
   integrating an ATM network with other networks through a gateway connected to an ATM switch/router device;
   providing through the gateway switched/routed connections to various end terminations of an external network;
   switching/routing calls and services received from the external network through the ATM network by controls supplied to switches/routers by a mobility server platform (MSP) connected to the ATM network;
   connecting wireless stations to switching/router nodes of the ATM network by protocol conversion of signaling to that of the wireless stations; and
   the gateway connecting a GPRS backbone IP network to an ATM backbone network at an ATM switch/router;
   and connecting base stations to the communication network through interworking functions (IWF) for converting service protocols to achieve network integration.

18. The method of claim 17, comprising:
   the MSP connected to at least one ATM switch/router for controlling call and services routing from the GPRS to the BSs through out the ATM network.

* * * * *